United States Patent [19]

Iida et al.

[11] 4,082,590
[45] Apr. 4, 1978

[54] PROCESS FOR MANUFACTURING A FLEXIBLE CYLINDRICAL BODY

[75] Inventors: Norihiko Iida; Shigeto Gobaru, both of Kawagoe, Japan

[73] Assignee: National Marineplastic Co., Ltd., Tokyo, Japan

[21] Appl. No.: 646,005

[22] Filed: Jan. 2, 1976

Related U.S. Application Data

[63] Continuation-in-part of Ser. No. 483,059, Jun. 25, 1974, abandoned.

[30] Foreign Application Priority Data

Jun. 28, 1973 Japan ................................. 48-73074

[51] Int. Cl.² .......................................... B32B 31/26
[52] U.S. Cl. ................................. 156/144; 156/156; 156/275; 264/27; 264/96; 264/269; 264/314
[58] Field of Search ....................... 264/89, 94, 96, 99, 264/269, 314, DIG. 52, 25, 27; 156/144, 156, 272, 275, 285, 287

[56] References Cited

U.S. PATENT DOCUMENTS

| | | | |
|---|---|---|---|
| 2,593,714 | 4/1952 | Robinson | 156/156 |
| 2,711,985 | 6/1955 | Olson | 156/287 X |
| 2,724,672 | 11/1955 | Rubin | 156/287 |
| 2,897,840 | 8/1959 | Roberts et al. | 264/DIG. 52 |
| 2,995,781 | 8/1961 | Sipler | 264/314 X |
| 3,294,607 | 12/1966 | Rothermel et al. | 156/144 |

*Primary Examiner*—Jan H. Silbaugh

[57] ABSTRACT

A process for manufacturing a flexible cylindrical body includes the steps of providing a flexible preform of non-resilient synthetic material which is inflatable to cylindrical form, inserting the preform into an elongated coil of an electrically conductive material having a diameter relative to that of the preform in its inflated cylindrical form such that the preform is expanded in an unstressed condition into engagement with the inner diameter of the coil, the inner face of the coil being coated with an adhesive material, and applying a predetermined voltage to the coil to thereby fuse the adhesive material and connect the coil and preform.

8 Claims, 3 Drawing Figures

PROCESS FOR MANUFACTURING A FLEXIBLE CYLINDRICAL BODY

BACKGROUND OF THE INVENTION

The present application is a continuation-in-part of our copending application Ser. No. 483,059 filed June 25, 1974, now abandoned, and claims the effective date thereof for all commonly disclosed subject matter.

The present invention relates to a process for manufacturing flexible cylindrical articles and more particularly to the manufacture of such articles made of a non-resilient textile sheet material supported in its cylindrical form by adhesion to an outer elongated coil of an electrically conductive material.

Articles of the type to which the present invention relates have been found useful as conduits for conducting air and other gases and as oil fences in seas, rivers and other bodies of water.

In the past the manufacture of such flexible cylindrical bodies has posed various difficulties owing primarily to the fact that the material is relatively soft and is not self-supporting without being impregnated with a resin or the like which adds stiffness to the material. A particular difficulty encountered heretofore has been in connection with the securing of the material to the surrounding coil. Heretofore resort has been had to the use of a resilient material which can be expanded into engagement with the coil. In the practice of such techniques the material from which the cylindrical article is to be made is expanded beyond its normal unstressed diameter and is adhesively secured to the coil in such stressed condition. Following setting of the adhesive and the consequent bonding of the flexible material to the coil the cylindrical tube is permitted to shrink to its normal diameter. However, at the points of connection with the coil the joints so formed are subjected to continued stress since the material of the cylindrical article at such locations cannot return to its original unstressed condition. The resultant article, therefore, includes adhesive joints which, without additional reinforcement of the article, limits its utility to environments where it is subject to relatively small stresses.

SUMMARY OF THE INVENTION

It is one object of the invention to provide a process for manufacturing flexible cylindrical articles supported within an outer elongated coil by which the completed article is substantially free of stress.

It is another object of the invention to provide a process for manufacturing flexible cylindrical articles supported within an outer elongated coil of electrically conductive material which does not require the use of mandrels or complex apparatus.

It is still another object of the invention to provide a process for manufacturing flexible cylindrical articles supported within an outer elongated coil of electrically conductive material which is simple to perform and results in secure attachment of the cylindrically formed material to the coil by means of relatively unstressed joints.

Other objects and advantages of the invention will become readily apparent from the following description of the invention.

According to the present invention there is provided a process for manufacturing a flexible cylindrical body supported within an elongated coil of an electrically conductive material comprising: preparing an elongated flexible substantially closed preform envelope of non-resilient material having an inlet therein for the admission of an inflation gas, said preform being adapted to be expanded into cylindrical form; inserting the substantially uninflated preform into an elongated coil of an electrically conductive material which is coated on at least the inner faces of the turns thereof with an adhesive material; the diameter of said preform in its unexpanded condition being sufficiently large relative to the inner diameter of said coil such that it can be expanded into cylindrical form and into engagement with the said coil in an unstressed state; inflating said preform into cylindrical form within said coil and into engagement therewith in an unstressed state; applying a predetermined voltage to said coil for fusing the adhesive material thereon and to secure said coil to said cylindrical preform; and thereafter releasing the inflation gas from the cylindrical preform and obtaining a flexible substantially unstressed cylindrical article.

BRIEF DESCRIPTION OF THE DRAWINGS

In order that the invention may be more fully understood it will now be described, by way of example, with reference to the accompanying drawings in which.

DETAILED DESCRIPTION OF THE INVENTION

Figure 1:
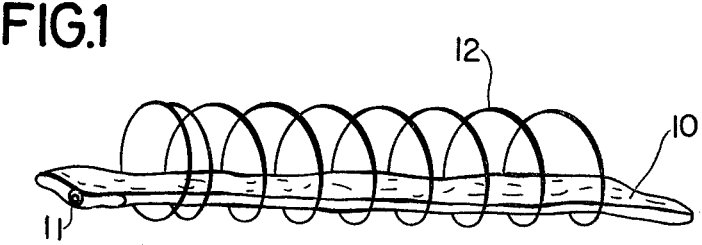
FIG. 1 is a perspective view of an elongated coil with a preform positioned therewithin prior to its being shaped into a cylindrical body by the process of the invention.
Figure 2:
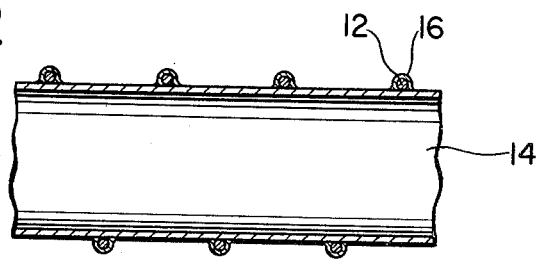
FIG. 2 is a fragmentary side view, in cross-section, of a cylindrical body formed in accordance with the process of the invention adhesively secured to the turns of an elongated coil.

Referring to the drawings, and particularly to FIGS. 1 and 2 thereof, there is shown an elongated preform 10 consisting essentially of an envelope which is completely closed except for opening 11 by which a gas, such as air, can be introduced to inflate the preform into a cylindrical shape 14. The preform is made of a non-resilient sheet material such as canvas or a synthetic material and is desirably rendered water and gas tight in any conventional manner. Thus, the preform may comprise a tarpaulin containing film, leather, sheet fiber or the like. Basically the preform is flexible so as not to be self-supporting when shaped into a cylindrical configuration.

The preform shown in FIG. 1 is placed within an elongated coil 12 of an electrically conductive material. The coil is coated on the inner face of the turns thereof with an adhesive material 16 capable of securing the preform to the coil at their points of engagement. One adhesive found suitable is a paste of vinyl chloride. The preform should be of such diametral dimension, relative to the coil, that upon inflation to its cylindrical form it is not stressed into engagement with the turns of the coil. In a preferred embodiment of the invention the width of the preform is greater than the inner diameter of the coil. Accordingly, since the material of the preform is non-resilient, even when its inflated diameter approximates that of the inner coil diameter, the material of the preform will not be subjected to stress when inflated into engagement with the turns of the coil.

Once the preform has been inflated into engagement with the turns of the coil a predetermined voltage is applied to the coil in order to heat the coil for the purpose of fusing the adhesive layer to the preform at the points of engagement with the coil. Desirably the temperature of the coil is regulated so as to produce some softening of the preform under the elevated temperature to obtain a good bond between the preform and the coil. The specific temperature to which the coil is raised, the voltage to be applied to the coil, and the time duration for application of the voltage to the coil are determined primarily by the particular adhesive material selected. Once the adhesive material has set so as to bond the preform to the coil at their points of engagement the gas is released from within the cylindrical body.

As clearly shown in FIG. 2, the preform in its cylindrical form and secured to the coil does not exhibit any sags or corrugations as is characteristic of prior art articles of this type which have been formed from a resilient material and have been expanded byond their normal diameter and subsequently been permitted to shrink back to normal diametral size. It is apparent that the final article produced in accordance with this invention is relatively free from stress created during the manufacturing process.

Figure 3:
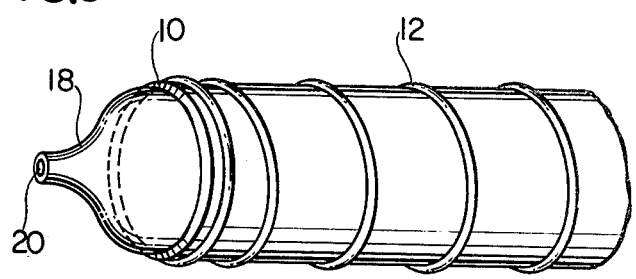
FIG. 3 is a perspective view of a cylindrical body which has been expanded into engagement with the turns of an elongated coil in accordance with a modification of the process to be employed with the arrangement depicted in FIG. 1.

Referring to FIG. 3 of the drawings there is shown the use of an elongated inflatable member or sack 18 having an opening 20 at one end thereof for the introduction of an inflation gas thereinto. The preform 10 in this instance may be closed at one end or open at both ends so as to accommodate insertion of the sack thereinto. Upon insertion of the sack 18 into the preform, and either with or without the preliminary introduction of any inflation gas into the sack, the sack and preform are positioned within elongated coil 12. The inflatable sack 18 is thereupon inflated to the extent necessary to expand the preform from its collapsed condition into cylindrical form in engagement with the turns of the coil. As in the process described with reference to FIG. 1 of the drawings a predetermined voltage is applied to the coil so as to effect a fusing of the adhesive material which is coated on at least the inner faces of the coil turns and thereby bond the preform to the coil at such points of engagement. Once fusion has been effected the sack is deflated and withdrawn from within the cylindrical body. As with the embodiment described in conjunction with FIG. 1, the diameter of the preform in its unexpanded state is sufficiently large relative to the inner diameter of the coil as to permit expansion of the preform into its cylindrical form and into engagement with the turns of the coil in a substantially unstressed state.

By the process of this invention a flexible cylindrical article supported within an elongated coil can thus be easily produced with secure points of connection between the cylindrical body and coil and with the avoidance of stressed joints. It will be apparent that variations and modifications of the process may be made within the scope of the claims herein without departing from the spirit of the invention.

What we claim is:

1. A process for manufacturing a flexible cylindrical body comprising: preparing an elongated flexible substantially closed preform envelope having an inlet therein for the admission of an inflation gas, said preform having an elongated cylindrical shape of predetermined diameter and being made of a non-resilient material such that when said preform is inflated it assumes a substantially unstressed cylindrical form; inserting the substantially uninflated preform into an elongated coil of an electrically conductive material which is coated on at least the inner faces of the turns thereof with an adhesive material; the diameter of said preform in its expanded condition being sufficiently large relative to the inner diameter of said coil such that it is capable of engagement with the said coil in said unstressed cylindrical form; inflating said preform into said cylindrical form within said coil and into engagement therewith in an unstressed state; applying a predetermined voltage to said coil for fusing the adhesive material thereon and to secure said coil to said cylindrical preform; and thereafter releasing the inflation gas from the cylindrical preform and obtaining a flexible substantially unstressed cylindrical article without sags or corrugations thereon.

2. A process according to claim 1, wherein said preform is made of canvas and said adhesive material is a vinyl chloride paste.

3. A process according to claim 1, wherein the diameter of said preform in its unexpanded state is larger than the inner diameter of said coil.

4. A process according to claim 1, wherein said preform is made of a synthetic material.

5. A process for manufacturing a flexible cylindrical body supported within an elongated coil of an electricallly conductive material comprising: preparing an elongated flexible preform of non-resilient material adapted to admit the insertion of an inflatable sack concentrically therewithin, said preform having an elongated cylindrical shape of predetermined diameter and being made of a non-resilient material such that when said preform is inflated, it assumes a substantially unstressed cylindrical form; inserting an inflatable sack in said preform and placing said preform with said sack therein into an elongated coil of an electrically conductive material which is coated on at least the inner faces of the turns thereof with an adhesive material; the diameter of said preform in its expanded condition being sufficiently large relative to the inner diameter of said coil such that it is capable of engagement with the said coil in said unstressed cylindrical form; inflating said inflatable sack with an inflation gas and expanding said preform into said cylindrical form within said coil and into engagement therewith in an unstressed state; applying a predetermined voltage to said coil for fusing the adhesive material and to secure said coil to said cylindrical preform; and thereafter releasing the inflation gas from said sack and withdrawing the sack from said cylindrical preform to obtain a flexible substantially unstressed cylindrical conduit without sags or corrugations.

6. A process according to claim 5, wherein said preform is made of canvas and said adhesive material is a vinyl chloride paste.

7. A process according to claim 5, wherein the diameter of said preform in its unexpanded state is larger than the inner diameter of said coil.

8. A process according to claim 5, wherein said preform is made of a synthetic material.

* * * * *